United States Patent

Lindenmann et al.

[15] 3,681,361

[45] Aug. 1, 1972

[54] DISUBSTITUTED PHENYL-4-PIPERIDONES

[72] Inventors: Adolf Lindenmann, Birmannagasse 19, Basel; Rudolf Suess, Funfeichenweg, Bettingen, both of Switzerland

[22] Filed: May 25, 1970

[21] Appl. No.: 48,679

Related U.S. Application Data

[62] Division of Ser. No. 660,910, Aug. 16, 1967, Pat. No. 3,574,215.

[52] U.S. Cl. .....260/293.8, 260/293.58, 260/293.76, 260/293.78

[51] Int. Cl. ..............................................C07d 29/20

[58] Field of Search......................260/293.8, 293.58

[56] References Cited

FOREIGN PATENTS OR APPLICATIONS 1,434,489   2/1966   France

*Primary Examiner*—Henry R. Jiles
*Assistant Examiner*—S. D. Winters
*Attorney*—Browdy & Neimark

[57] ABSTRACT

3-(3,4-disubstituted-phenyl)-4-piperidones useful as intermediates for the synthesis of a variety of organic compounds, especially pharmaceuticals.

2 Claims, No Drawings

DISUBSTITUTED PHENYL-4-PIPERIDONES

This is a divisional application of Ser. No. 660,910, filed Aug. 16, 1967, now U.S. Pat. No. 3,574,215.

This invention relates to new heterocyclic compounds and to a process for the production thereof.

The invention provides naphthyridine derivatives of formula I,

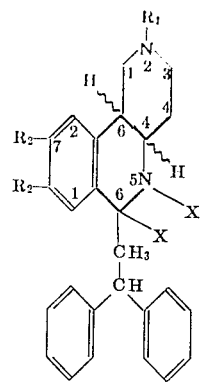

in which $R_1$ signifies lower alkyl or benzyl, each of the two symbols $R_2$ signifies, hydroxy or lower alkoxy, or the symbols $R_2$ together signify methylenedioxy, and each of the two symbols X signifies hydrogen, or the symbols X together signify a second bond between the carbon and the nitrogen atom, and their salts with inorganic or organic acids.

The new compounds have a benzo[c][1,6]naphthyridine structure, the numbering of which may be seen in formula I. When the symbols X in formula I together signify a second bond between the carbon and the nitrogen atom, the compounds are 1,2,3,4,4a,10b-hexa-hydrobenzo[c][1.6]naphthyridine derivatives which have asymmetric carbon atoms in the positions 4a and 10b. These compounds may therefore be obtained in two racemic forms. When, however, each of the two symbols X in formula I signifies hydrogen, the compounds are 1,2,3,4,4a,5,6,10b-octahydrobenzo[c][1,6]naphthyridine derivatives which aside from the 4a and 10b positions also have an asymmetric carbon atom in the 6 position. These compounds may therefore be obtained in four racemic forms. The compounds obtained by the ring closure are hereinafter named "isomer A" or "isomer B"; they differ from each other in the stereochemistry of the ring linkage (positions 4a and 10b).

The present invention further provides processes for the production of compounds of the general formula I and their acid addition salts;

a. Compounds of the general formula Ia,

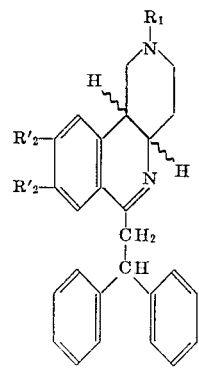

wherein $R_1$ signifies lower alkyl or benzyl, and each of the symbols $R_2'$ signifies or lower alkoxy, or the symbols $R_2'$ together signify methylenedioxy, and their acid addition salts, may be produced by cyclizing a compound of the general formula II,

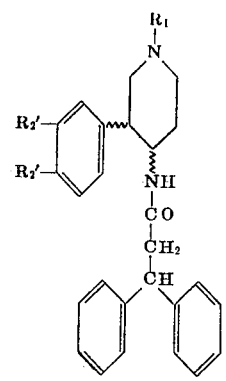

wherein $R_1$ and $R_2'$ have the above significance, and where an acid addition salt is required, the resulting compound is reacted with an organic or inorganic acid;

b. Compounds of the general formula Ib,

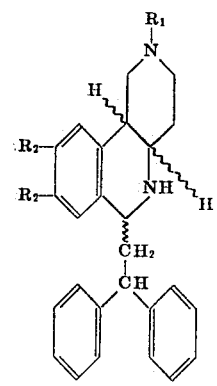

wherein $R_1$ and $R_2$ have the above significance, and their acid addition salts, may be produced by reducing the double bond between the 5- and 6- positions of a compound of the general formula Ic,

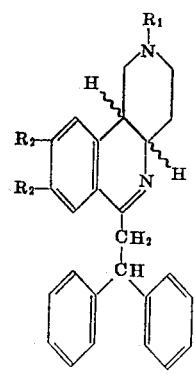

wherein $R_1$ and $R_2$ have the above significance, the reduction being carried out in a neutral or alkaline medium and under reaction conditions which do not affect the benzyl radical when a compound of formula Ib, in which $R_1$ signifies benzyl is required, and where an acid addition salt is required, the resulting compound is reacted with an organic or inorganic acid;

c. Compounds of the general formula Id,

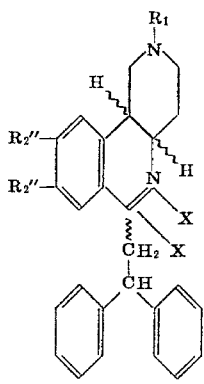

Id wherein $R_1$ and X have the above significance, and $R_2''$ signifies hydroxy, and their acid addition salts, may be produced by subjecting to an acid ether split reaction a compound of the general formula Ie,

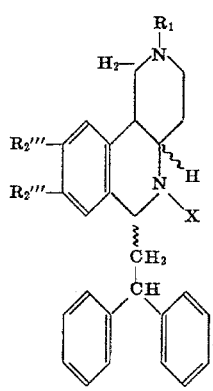

Ie wherein $R_1$ and X have the above significance, each of the symbols $R_2'''$ signifies lower alkoxy, or the symbols $R_2'''$ together signify methylenedioxy, and where an acid addition salt is required, the resulting compound is reacted with an organic or inorganic acid.

Any isomer mixtures which are obtained in the above processes may be separated into their individual racemates, and any individual racemates may be split into their optically active antipodes.

The starting materials of formula II, with the exception of the two isomeric 4-(3,3-diphenylpropionylamino)-1-methyl-3-phenylpiperidines, have hitherto not been described in the literature. They may be produced by acylating piperidylamines of formula III,

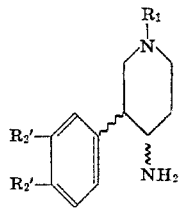

III in which $R_1$ and the two symbols $R_2'$ have the above significance, with a chloride, bromide, or iodide of 3,3-diphenylpropionic acid in an inert organic solvent, e.g. chloroform, and preferably in the presence of a tertiary organic base, e.g. pyridine. Acylation may, however, also be effected with 3,3-diphenylpropionic acid itself, with its azide or with one of its lower alkyl esters. In the first case, reaction may be effected at the boil in an inert organic solvent, e.g. xylene, and the water which is formed may be continuously removed from the reaction mixture by azeotropic distillation.

The amides of formula II have two asymmetric carbon atoms as do the piperidylamines of formula III and may therefore be obtained in two racemic forms. A separation of the sterically uniform racemates of the A and B series is possible at the amide stage, as well as at the amine stage. Also, a separation of the racemates into their optically active antipodes is possible. In the cyclization step of the process, the amides may be used as mixtures of isomers, as pure A or B racemates, or as optically uniform compounds. The amides of formula II are preferably used as uniform racemates (isomer A or B). The ring closure step, which may be effected in accordance with the known method of Bischler and Napieralski, does not alter the steric arrangement of the substituents on the piperidine ring, so that the stereochemistry of the two centers of asymmetry in positions 4a and 10b (ring linkage) of the resulting 1,2,3,4,4a,10b-hexahydrobenzo[c][1,6]naphthyridine derivatives of formula Ia agrees with that of the starting materials. Therefore, isomer mixtures, A or B racemates, or optically uniform compounds may be obtained, dependent on the composition of the starting materials.

Cyclization may be effected by boiling an amide of formula II with phosphorus oxychloride and/or phosphorus pentoxide under reflux for a prolonged period of time, e.g. 1 to 10 hours. This reaction may be carried out in an organic solvent such as chloroform, benzene, toluene, xylene or tetraline. In another embodiment of the process, the ring closure is effected by boiling in an excess of phosphorus oxychloride. Amides which are not substituted in the benzene ring usually require stronger reaction conditions and are, for example, treated with phosphorus pentoxide in boiling phosphorus oxychloride.

For example 3-(3,4-dimethoxyphenyl)-4-(3,3-diphenylpropionylamino)-1-methylpiperidine in an organic solvent which is inert under the reaction conditions, e.g. benzene, toluene, or xylene, is boiled with phosphorus oxychloride under reflex, e.g. for about 4 hours. The solvent and excess phosphorus oxychloride are subsequently evaporated, water is added to the residue, and heating is carried out in a boiling water bath for about 40 minutes. The resulting clear solution is then made alkaline by the addition of potassium carbonate, and the oil which precipitates is extracted with a water-immiscible organic solvent, such as chloroform. The organic phase is subsequently washed until neutral, such as with an aqueous sodium chloride solution. This is then dried and concentrated by evaporation. The crude compound of formula Ia obtained as residue may be purified in manner known per se, such as by crystallization, distillation, adsorption chromatography, and salt formation.

Other condensation agents which are suitable for the cyclization in accordance with Bischler-Napieralski, are polyphosphoric acid, phosphorus pentachloride, aluminum chloride, and zinc chloride. These may be used as condensation agents in place of phosphorus oxychloride and/or phosphorus pentoxide.

Upon reduction of 1,2,3,4,4a,10b-hexahydrobenzo[c][1,6]naphthyridine derivatives, a third center of asymmetry is formed in the 6 position of the ring structure, so that the corresponding 1,2,3,4,4a,5,6,10b-octahydrobenzo[c][1,6]naphthyridine derivatives may exist in 4 racemic forms, namely 2 racemates of the A series and 2 racemates of the B series. The reduction of the double bond in the 5–6 position is, however, governed by stereometric factors, and for this reason only one of the two possible racemic forms, or an isomer mixture in which one of the two racemates predominates, is obtained.

The reduction may be effected by catalytic hydrogenation, e.g. in the presence of platinum, palladium or Raney nickel, in a lower alkanol, e.g. ethanol, at room temperature and at a normal or elevated pressure. When the hexahydrobenzo[c][1,6]-naphthyridine derivatives to be reduced have a benzyl radical in the 2 position, they are used as free bases, as under these conditions hydrogenation may be stopped after one mol of hydrogen has been taken up, i.e. after saturation of the double bond in the 5–6 position and before the benzyl radical has been affected.

The octahydro compounds are obtained by filtering off the catalyst, evaporating the filtrate to dryness, and purifying the crude residue in manner known per se.

A complex alkali metal hydride, e.g. sodium borohydride in methanol or lithium aluminium hydride in ether, tetrahydrofuran, dioxane or 1,2-dimethoxy ethane may also be used as reducing agents. In this case after decomposition of the excess reducing agent and the resulting complex the reduction products are isolated by dividing between water and a water-immiscible organic solvent, e.g. benzene, and are subsequently purified in manner known per se.

Furthermore, nascent hydrogen may also be used for the reduction. In this case, the hexahydrobenzo[c][1,6]naphthyridine derivatives may be treated with metallic zinc or tin in an aqueous acid, with metallic sodium in a lower alkanol, or with sodium amalgam in water.

Compounds of formula I, which have a hydroxy radical in the 8 and 9 position, are produced by subjecting the corresponding 8,9-dialkoxy- or 8,9-methylenedioxy derivatives of the 1,2,3,4,4a,10b-hexahydro or 1,2,3,4,4a,5,6,10db-octahydro series to an acid ethe splitting, preferably by boiling for 1 to 5 hours with an approximately 50 percent aqueous hydrogen bromide solution. After the reaction has been completed, the mixture is allowed to cool, is then evaporated to dryness in a vacuum, and the 8,9-dihydroxy compounds obtained as residue are purified in manner known per se.

When the amides of formula II used as starting materials for the ring closure indicated above are in the form of isomer mixtures and/or when reduction of the double bond in the 5–6 position of the ring structure is not influenced by stereometric factors, the final products of formula I are obtained as mixtures of two to four racemates. These racemates may optionally be separated in known manner, such as by chromatography or by fractional crystallization.

The individual uniform racemates may subsequently be separated into their optically active antipodes. For this purpose, the racemates may be reacted with optically active acids, such as d-tartaric acid, 1-malic acid, or d- or 1-mandelic acid. The resulting diastereoisomeric salts may then be separated by fractional crystallization and, if desired, the resulting optically active bases may again be liberated from the corresponding salts with an alkali.

The final products of formula I in the form of mixtures of isomers, sterically uniform racemates, or pure optically active compounds, may be converted to the corresponding salts by reaction with inorganic or organic acids. Examples of salts for acid addition salt formation are hydrochloric, hydrobromic, sulphuric, maleic, fumaric, malic, tartaric, benzoic, methanesulphonic, p-toluenesulphonic or cyclohexylsulphamic acid.

The piperidylamines of formula III, have hitherto not been described in the literature may, for example, be produced as follows:

Phenylacetic acids of formula IV,

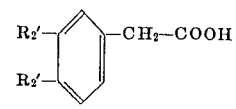

IV in which the two symbols $R_2'$ have the above significance, are converted into their lower alkyl esters, e.g. with an excess of the corresponding lower alkanols in the presence of an acid, such as hydrogen chloride. The resulting esters are reacted with lower dialkyl esters of oxalic acid in the presence of a strongly basic condensation agent, e.g. sodium ethylate in toluene. The resulting compounds of formula V,

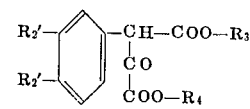

V in which the two symbols $R_2'$ have the above significance, and each of $R_3$ and $R_4$ signifies lower alkyl, are treated with formaldehyde, e.g. with an aqueous formaline solution in the presence of an alkali, such as potassium carbonate, and the resulting products are distilled, whereby phenylacrylic acid esters of formula VI,

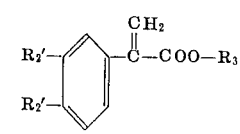

VI in which the two symbols $R_2'$ and $R_3$ have the above significance, are obtained.

The phenylacrylic acid esters of formula VI are condensed with amines of formula VII, $$R_1 - NH_2 \quad \text{VII}$$

in which $R_1$ has the above significance, and the condensation products are reacted with compounds of formula VIII, $$Y-CH_2-CH_2-COO-R_5 \quad \text{VIII}$$

in which Y signifies chlorine or bromine, and $R_5$ signifies lower alkyl, in the presence of an acid-binding agent, whereby compounds of formula IX,

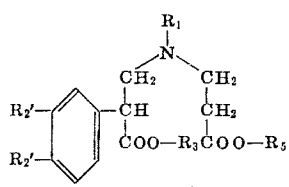

in which $R_1$, the two $R_2'$, $R_3$ and $R_5$ have the above significance, are obtained. Compounds of formula IXa,

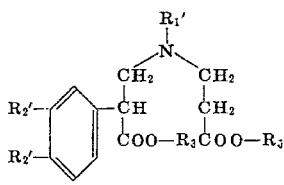

in which the two $R_2'$, $R_3$ and $R_5$ have the above significance, and $R_1'$ signifies lower alkyl, can also be obtained by reacting phenylacrylic acid esters of the above formula VI with amino acid esters of formula X, $$R_1'-NH-CH_2-CH_2-COO-R_5 \quad \text{X}$$

in which $R_1'$ and $R_5$ have the above significance.

The resulting compounds of formulas IX and IXa are cyclized by heating with a strong basic condensation agent, e.g. sodium hydride in toluene. The resulting products are converted by hydrolysis and decarboxylation into the corresponding piperidones of formula XI,

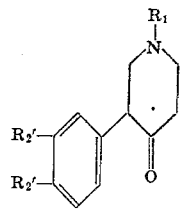

in which $R_1$ and the two $R_2'$ have the above significance, e.g. by heating in an aqueous mineral acid, such as concentrated hydrochloric acid.

Of the piperidones of formula XI indicated above, 3-(3,4-dimethoxyphenyl)-1-methyl-4-piperidone, 1-methyl-3-(3,4-methylenedioxyphenyl)-4-piperidone and 1-benzyl-3-(3,4-dimethoxyphenyl)-4-piperidone are especially useful; these hitherto unknown compounds may be widely used as intermediates for the synthesis of a variety of organic compounds, especially pharmaceuticals.

The above piperidones of formula XI are reacted with hydroxylamine hydrochloride and the resulting oximes are reduced to give piperidylamines of formula III. If a benzyl radical is present or required, the reduction is carried out in a neutral or alkaline medium, and reaction conditions are used which do not affect this radical. Suitable methods are, for example, hydrogenation over a metal catalyst, e.g. Raney nickel, reaction with complex alkali metal hydrides, e.g. lithium aluminium hydride or sodium borohydride, or treatment with metallic sodium in a lower alkanol. In accordance with an embodiment of the process, the piperidones XI are catalytically hydrogenated in the presence of ammonia, e.g. in a solution of ammonia in ethanol at 60° C and 51 atmospheres in the presence of Raney nickel. The resulting imine intermediates are reduced in situ to the corresponding piperidylamines of formula III. When a benzyl radical is present, reduction conditions are used which do not affect this radical.

The reductions described above usually give mixtures of the two possible racemic forms of the piperidylamines III, the percentage compositions of which may vary depending on the reduction conditions. If desired, the resulting mixtures are separated, e.g. by fractional crystallization of their acid addition salts, into the individual racemates, and these are then optionally separated into their optically active components in manner known per se.

The naphthyridine derivatives of formula I have hitherto not been described in the literature. They exhibit valuable pharmacodynamic effects on the heart and circulation, especially a positive inotropic heart effect, a lowering of heart frequency, an improvement of coronary blood circulation and a lowering of the blood pressure. They are therefore indicated for use as medicaments, especially in the treatment of various heart and circulatory disorders, such as for treating various forms of heart insufficiency, coronary illnesses and other circulatory disorders. A suitable average daily dose is 0.07 to 7 mg/kg body weight of warm-blooded animal.

The compounds of the invention or their water-soluble, physiologically tolerable acid addition salts may be used as pharmaceuticals on their own or in the form of appropriate medicinal preparations, e.g. tablets, dragees, suppositories and injectable solutions, for administration, e.g. enterally or parenterally. Aside from the usual inorganic or organic adjuvants which are physiologically inert, e.g. lactose, starch, talcum, stearic acid, water, alcohols, glycerin, vegetable oils, natural or hardened oils and waxes, the preparations may also contain suitable preserving, stabilizing or wetting agents, solubilizers, sweetening or coloring substances and flavorings.

The term "in manner known per se" as used herein designates methods in use or described in the literature on the subject.

In the following non-limitative Examples all temperatures are indicated in degrees Centigrade and are uncorrected.

EXAMPLE 1: 8,9-dimethoxy-6-(2,2-diphenylethyl)-1,2,3,4,4a,10b2-methylbenzo[c][1,6]naphthyridine (Isomer A).

80 g of 3-(3,4-dimethoxyphenyl)-4-(3,3-diphenyl-propionylamino)-1-methylpiperidine (Isomer A as racemate) are dissolved in 600 ml of benzene and after the addition of 200 ml of phosphorus oxychloride the mixture is heated to the boil at reflux for 4 hours. The benzene and excess phosphorus oxychloride are evaporated, 400 ml of water are added to the residue and heating is effected on a boiling water bath for 40 minutes. Potassium carbonate is subsequently added to the clear solution until a strongly alkaline reaction is obtained and the oil which separates is extracted thrice with chloroform. The combined chloroform layers are washed with a saturated aqueous sodium chloride solution, are dried over sodium sulphate and concentrated by evaporation. The crystalline residue is recrystallized from methanol/ethanol, whereby pure 8,9-dimethoxy-6-(2,2-diphenylethyl)-1,2,3,4,4a,10b-hexahydro-2-methylbenzo[c]1,6]naphthyridine (Isomer A as racemate), having a melting point of 189°–191°, is obtained. The dihydrochloride has a melting point of 241°–243° (decomposition) after crystallization from ethanol. The starting material may be produced as follows:

a. 2-(3,4-dimethoxyphenyl)acrylic acid ethyl ester, (3,4-dimethoxy-atropic acid ethyl ester)

1435 g of oxalic acid diethyl ester are added while stirring during the course of 15 minutes to a suspension of sodium ethylate in 3000 ml of toluene (produced from 113 g of metallic sodium). 1000 g of 2-(3,4-dimethoxyphenyl)acetic acid ethyl ester (homoveratric acid ethyl ester) are added to the resulting solution at a temperature of 30°–40° during the course of 25 minutes and the resulting dark solution is heated to the boil at reflux while stirring for 2 hours. Cooling is subsequently effected to −45°, 1230 ml of 4N sulphuric acid are subsequently allowed to flow in during the course of 3 minutes at a temperature of −10° and 0.5 g of hydroquinone are subsequently added. 400 g of a formalin solution (36 percent formaldehyde in water) are allowed to flow into the above reaction mixture while stirring and 1280 ml of a saturated aqueous potassium carbonate solution are subsequently added dropwise during the course of 1 hour. The mixture is stirred at room temperature for 2½ hours and a further 200 g of formalin solution are subsequently added. The reaction mixture is stirred at room temperature overnight and subsequently diluted with 4000 ml of water. The toluene layer is separated, washed once with water, dried over sodium sulphate and concentrated by evaporation in a vacuum after the addition of 0.5 g of hydroquinone. The residue is distilled in a high vacuum, whereby decomposition initially sets in; the relatively unstable 2-(3,4-dimethoxyphenyl)acrylic acid ethyl ester distills over at 135°–140°/0.06 mm of Hg as a yellow viscous oil and is further worked up without delay.

b. 5-ethoxycarbonyl-3-(3,4-dimethoxyphenyl)-1-methyl-4-piperidone.

412 g of 3-methylaminopropionic acid ethyl ester are added to 738 g of the above 2-(3,4-dimethoxyphenyl)acrylic acid ethyl ester while stirring during the course of 30 minutes and the mixture is stirred at room temperature for 72 hours. 2500 ml of toluene are subsequently added to 300 g of a sodium hydride suspension (50 percent in paraffin oil) and 150 g of the above reaction mixture are allowed to flow in, in an atmosphere of nitrogen. Heating is effected to 80° and after the reaction has commenced a further 1000 g of the above reaction mixture are added dropwise during the course of 2 hours. The mixture is subsequently heated to the boil at reflux for 4 hours, is cooled to −10°, 376 ml of glacial acetic acid are carefully added and 340 ml of water are allowed to flow in while stirring well; a crystalline precipitate gradually results which is separated by filtration. Most of the toluene is removed from the filtrate in a vacuum and a solution of hydrogen chloride in ethanol is added while stirring and cooling until an acid reaction to Congo red is obtained. 2500 ml of ether are added, the mixture is allowed to stand in a refrigerator overnight and the resulting precipitate is filtered off. The resulting 5-ethoxycarbonyl-3-(3,4-dimethoxyphenyl)-1-methyl-4-piperidone hydrochloride has a melting point of 190-192° (decomposition).

c. 3-(3,4-dimethoxyphenyl)-1-methyl-4-piperidone.

1170 g of 5-ethoxycarbonyl-3-(3,4-dimethoxyphenyl)-1-methyl-4-piperidone hydrochloride are heated to the boil at reflux in 5000 ml of 4N hydrochloric acid for 2½–3 hours. The hydrochloric acid is evaporated in a vacuum, 750 ml of water are added, the 3-(3,4-dimethoxyphenyl)-1-methyl-4-piperidone is precipitated as an oil by the addition of a large amount of potassium carbonate and extraction is effected with 2500 ml of chloroform. The chloroform solution is dried over sodium sulphate and concentrated by evaporation, whereby the compound indicated in the heading is obtained as residue; the picrate has a melting point of 191°–192° (decomposition) after crystallization from ethanol.

d. 3-(3,4-dimethoxyphenyl)-1-methyl-4-piperidone-oxime,

The crude 3-(3,4-dimethoxyphenyl)-1-methyl-4-piperidone obtained in section c) is taken up in 800 ml of ethanol and a suspension of 250 g of hydroxylamine hydrochloride in 2300 ml of hot ethanol is added while stirring. The mixture is heated to the boil at reflux for 4 hours, the crystalline mass is subsequently stirred for a further 12 hours at room temperature and filtration is effected. The resulting crude 3-(3,4-dimethoxyphenyl)-1-methyl-4-piperidone-oxime hydrochloride has a melting point of 220°–221° (decomposition). The free base has a melting point of 150° after crystallization from ethanol.

e. 3-(3,4-dimethoxyphenyl)-1-methyl-4-piperidylamine. (Isomers A and B)

350 g of 3-(3,4-dimethoxyphenyl)-1-methyl-4-piperidone-oxime are hydrogenated in 2500 ml of ethanol over Raney-Nickel in an autoclave at 51 atmospheres and 80° for 6 hours. After cooling the catalyst is filtered off, the filtrate is concentrated to a volume of 500 ml and 760 ml of a 3.53 normal solution of hydrogen chloride in ethanol is added; after cooling the solution to 35° the colorless precipitate is filtered off. This precipitate consists of a practically pure dihydrochloride of the isomer A (racemate) of the compound indicated in the heading. The dihydrochloride of the corresponding isomer B remains in the filtrate and then also crystallizes. Isomer A: dihydrochloride: M.P. 321° (decomposition) after crystallization from 80 percent ethanol. Free base: B.P. 135°/0.04 mm of Hg; M.P. 78°–80° (from ethyl acetate/petroleum ether). Isomer B: dihydrochloride: M.P. 280° (decomposition) after crystallization from 90 percent ethanol. Free base: B.P. 146°/0.09 mm of Hg; M.P. of the solidified material 77°–79°. Mixed M.P. of the isomers A and B 66°–74°.

f. 3-(3,4-dimethoxyphenyl)-4-(3,3-diphenyl-propionylamino)-1-methylpiperidine. (Isomer A)

20.4 g of pyridine are added to 57.9 g of the above 3-(3,4-dimethoxyphenyl)-1-methyl-4-piperidylamine (isomer A, racemate) in 200 ml of chloroform and subsequently 62.5 g of 3,3-diphenylpropionyl chloride dissolved in 150 ml of chloroform are added during the course of one-half hour while cooling with ice. The mixture is subsequently heated at reflux for 2½ hours, is cooled and shaken out with water, with saturated potassium carbonate solution and again with water. The chloroform layer is dried over sodium sulphate and concentrated by evaporation. The oily residue is recrystallized from ethyl acetate/petroleum ether 1:2; the racemic 3-(3,4-dimethoxyphenyl)-4-(3,3-diphenyl-propionylamino)-1-methylpiperidine (isomer A) has a melting point of 109°.

Example 2:

6-(2,2-diphenylethyl)-1,2,3,4,4a,10b-hexahydro-2-methyl-8,9-methylene-dioxybenzo[c][1,6]naph thyridine (isomer A).

5.8 g of 4-(3,3-diphenylpropionylamino)-1-methyl-3-(3,4-methylene-dioxyphenyl)piperidine (isomer A as racemate) are dissolved in 50 ml of benzene and 4.0 g of phosphorus oxychloride are added. The mixture is heated to the boil at reflux for 4 hours, the benzene and excess phosphorus oxychloride are subsequently evaporated, 25 ml of water are added to the residue and heating on a boiling water bath is effected for 40 minutes. Solid potassium carbonate is subsequently added to the yellow, clear solution until an alkaline reaction is obtained and extraction is effected with chloroform; the chloroform layer is washed with a saturated aqueous sodium chloride solution, dried over sodium sulphate and concentrated by evaporation. The residue is recrystallized from ethanol, whereby 6-(2,2-diphenylethyl)-1,2,3,4,4a,10b-hexahydro-2-methyl-8,9-methylene-dioxybenzo[c][1,6]naphthyridine (isomer A as racemate) having a M.P. of 195°, is obtained; The dihydrochloride has a M.P. of 248° (decomposition), after crystallization from ethanol/ether. The starting material may, for example, be produced as follows:

a. 3,4-methylene-dioxyphenyl-acetic acid ethyl ester.

A suspension of 100 g of 3,4-methylene-dioxyphenyl-acetic acid in 300 ml of absolute ethanol is saturated with dry hydrogen chloride gas while stirring, whereby the material gradually dissolves. The solution is allowed to stand at room temperature for 36 hours, the excess ethanol is subsequently evaporated and the yellow, oily residue is taken up in ether. The resulting ether solution is shaken out with ice-water, then with an aqueous sodium bicarbonate solution and again with ice-water, is dried over sodium sulphate and concentrated by evaporation. The residue is distilled in a high vacuum; the compound indicated in the heading has a B.P. of 100°/0.01 mm of Hg.

b. 2-(3,4-methylene-dioxyphenyl)acrilic acid ethyl ester.

170 g of oxalic acid diethyl ester are added while stirring during the course of 5 minutes to a suspension of sodium ethylate in 300 ml of absolute toluene (produced from 13.4 g of metallic sodium), whereby the material dissolves. 110 g of 2-(3,4-methylene-dioxyphenyl) acetic acid ethyl ester are then added at a temperature of 30°–40° and the resulting dark solution is heated to the boil at reflux while stirring for 2 hours. Cooling is then effected to −45° and 146 ml of 4N aqueous sulphuric acid are allowed to flow into the solution during the course of 3 minutes at a temperature of −10°; 0.1 g of hydroquinone is finally added.

49 g of a formalin solution (36 percent formaldehyde in water) are allowed to flow into the above reaction mixture while stirring and 155 ml of a saturated aqueous potassium carbonate solution are subsequently added dropwise during the course of 15 minutes. The mixture is stirred at room temperature for 2½ hours and a further 30 g of formalin solution are added thereto. The reaction mixture is stirred at room temperature overnight and is then diluted with 500 ml of water. The toluene layer is separated, washed once with water, dried over sodium sulphate and concentrated in a vacuum after the addition of 0.5 g of hydroquinone. The residue is distilled in a high vacuum, whereby decomposition initially occurs; the relatively unstable 2-(3,4-methylene-dioxyphenyl) acrilic acid ethyl ester distills over at 114°/0.02 mm of Hg as a yellow, viscous oil and is further worked up without delay.

c. 5-ethoxycarbonyl-1-methyl-3-(3,4-methylene-dioxyphenyl)-4-piperidone.

53 g of 3-methylaminopropionic acid ethyl ester are added while stirring during the course of 10 minutes to 88 g of the above 2-(3,4-methylene-dioxphenyl) acrilic acid ethyl ester and the mixture is stirred at room temperature for 72 hours.

400 ml of absolute toluene are then added to 38.4 g of a sodium hydride suspension (50 percent in paraffin oil) and 20 g of the above reaction mixture are allowed to flow in, in an atmosphere of nitrogen. Heating is effected to 80° and after the reaction commences a further 121 g of the above reaction mixture are added dropwise during the course of 1 hour. The mixture is subsequently heated to the boil at reflux for 4 hours, is cooled to −10° and 48 g of glacial acetic acid and 44 ml of water are carefully added; a crystalline precipitate gradually results and is separated by filtration. Most of the toluene is removed from the filtrate in a vacuum and a solution of hydrogen chloride in ethanol is added while stirring and cooling well until an acid reaction to Congo red is obtained, whereupon crystallization commences. 200 ml of ether are added, the mixture is allowed to stand in a refrigerator overnight and is then filtered. The resulting 5-ethoxycarbonyl-1-methyl-3-(3,4-methylene-dioxyphenyl)-4-piperidone hydrochloride has a M.P. of 212° with decomposition (after crystallization from methanol/ether).

d. 1-methyl-3-(3,4-methylene-dioxyphenyl)-4-piperidone.

65 g of 5-ethoxycarbonyl-1-methyl-3-(3,4-methylenedioxyphenyl)-4-piperidone hydrochloride are heated to the boil at reflux in 500 ml of 4N hydrochloric acid for 2½ 3 hours. The hydrochloric acid is evaporated in a vacuum, 100 ml of water are added, 1-methyl-3-(3,4-methylene-dioxyphenyl)-4-piperidone is precipitated as an oil by the addition of a large amount of potassium carbonate and extraction is effected with 300 ml of chloroform. The chloroform solution is dried over sodium sulphate and concentrated by evaporation; the compound indicated in the heading is obtained as residue and is further worked up as crude product.

e. 1-methyl-3-(3,4-methylene-dioxyphenyl)-4-piperidone-oxime.

The crude 1-methyl-3-(3,4-methylene-dioxyphenyl)-4-piperidone obtained above is taken up in 70 ml of ethanol and a suspension of 12.5 g of hydroxylamine hydrochloride in 100 ml of hot ethanol is added while stirring. The mixture is heated to the boil at reflux while stirring for 4 hours and the crystalline mass is subsequently stirred at room temperature for a further 12 hours. Evaporation to dryness is effected, the residue is taken up in 75 ml of water, the oxime is precipitated by the addition of a saturated aqueous potassium carbonate solution and extraction is effected with chloroform. The chloroform layer is separated, dried over sodium sulphate and concentrated by evaporation; the compound indicated in the heading results as a viscous oil which crystallizes and which has a melting point of 153°–155° after crystallization from ethyl acetate.

f. 1-methyl-3-(3,4-methylene-dioxyphenyl)-4-piperidylamine. (isomers A and B).

25 g of 1-methyl-3-(3,4-methylene-dioxyphenyl)-4-piperidone-oxime are hydrogenated in 300 ml of ethanol over Raney-Nickel in an autoclave for 6 hours at 51 atmospheres and 80°. After cooling the catalyst is filtered off, the ethanol is evaporated and the residue is distilled in a high vacuum; B.P. 131°/0.07 mm of Hg.

The distillate, which is a yellow, viscous oil and consists of a mixture of the isomers A and B (racemates) of the compound indicated in the heading, is chromatographed on 550 g of neutral aluminium oxide. The isomer A is eluted with benzene/ether 1:1, the isomer B with ether/chloroform 1:1. Isomer A : M.P. of the dihydrochloride 292°–297° (decomposition), after crystallization from methanol. Isomer B : M.P. of the dihydrochloride 307°–309° (decomposition), after crystallization from ethanol.

g. 4-(3,3-diphenylpropionylamino)-1-methyl-3-(3,4-methylene-dioxyphenyl)piperidine (isomer A as racemate).

2.8 g of 1-methyl-3-(3,4-methylene-dioxyphenyl)-4-piperidylamine (isomer A, racemate) are dissolved in 15 ml of chloroform and 3.1 g of 3,3-diphenylpropionyl chloride dissolved in 10 ml of chloroform are added while cooling with ice. The mixture is allowed to stand at room temperature for 2 hours, is heated to the boil at reflux for 1 hour, is subsequently diluted with chloroform and shaken out with 20 ml of a saturated aqueous potassium carbonate solution. The chloroform layer is washed with a saturated aqueous sodium chloride solution, is dried over sodium sulphate and concentrated by evaporation, whereby the compound indicated in the heading is obtained as residue and is further worked up without purification.

EXAMPLE 3:

2-benzyl-8,9-dimethoxy-6-(2,2-diphenylethyl)-1,2,3,4,4a,10b-hexahydrobenzo[c][1,6]naphthyridine (isomer A).

12.7 g of 1-benzyl-3-(3,4-dimethoxyphenyl)-4-(3,3-diphenylpropionylamino)piperidine (isomer A as racemate) are dissolved in 60 ml of benzene and heated to the boil at reflux with 6.8 g of phosphorus oxychloride for 1½ hours, whereby after 15 minutes the solution becomes turbid and an oil starts to precipitate. The excess phosphorus oxychloride and the solvent are subsequently evaporated, 50 ml of water are added to the residue and heating on a boiling water bath is effected for 30 minutes, whereby the oil crystallizes without previously dissolving. The mixture is allowed to cool, is filtered and the filtered residue is crystallized from methanol, whereby 2-benzyl-8,9-dimethoxy-6-(2,2-diphenylethyl)-1,2,3,4,4a,10b-hexahydrobenzo[c][1,6]naphthyridine dihydrochloride (isomer A as racemate) is obtained in the form of colorless crystals having a melting point of 218° (decomposition). The compound is slightly hygroscopic. The starting material may be produced as follows:

a. 1-benzyl-3-(3,4-dimethoxyphenyl)-4-piperidone.

730 g of 2-(3,4-dimethoxyphenyl)acrilic acid ethyl ester [production see Example 1, section a)] are added dropwise while stirring to a solution of 330 g of benzylamine in 500 ml of ethanol, whereby the temperature rises to 30°. The clear solution is allowed to stand at room temperature for 24 hours and 1050 g of 3-bromopropionic acid ethyl ester and 590 g of triethylamine are simultaneously added dropwise while stirring during the course of 3 hours, whereby a white precipitate results after a short time. The mixture is stirred at room temperature for 40 hours, the precipitate is filtered off, the filtrate is concentrated by evaporation and the evaporation residue is divided between benzene and water. The organic phase is separated, dried over sodium sulphate and concentrated by evaporation; the residue is dried in a high vacuum at 100° for 4 hours and is worked up as crude product.

1000 ml of toluene are added to 333 g of a sodium hydride suspension (50 percent in paraffin oil) and a solution of the above crude product in 1000 ml of toluene is added dropwise while stirring at such a rate that the temperature of the mixture amounts to 50°–70°. The mixture is subsequently heated to the boil at reflux for 3 hours, is then cooled to −10° and 420 ml of glacial acetic acid and then 380 ml of water are added in an atmosphere of nitrogen. The resulting precipitate is filtered off, the filtrate is dried over sodium sulphate, the solvent is evaporated and the 5-ethoxycarbonyl-1-benzyl-3-(3,4-dimethoxyphenyl)-4-piperidone obtained as residue is heated to the boil at reflux with 3500 ml of 4.5N hydrochloric acid for 3½ hours. The reaction mixture is shaken out once with benzene and solid potassium carbonate is added to the aqueous phase while cooling with ice until an alkaline reaction is obtained. The resulting dark oil is extracted with chloroform; the organic phase is separated, washed with water, dried over sodium sulphate and concentrated by evaporation, whereby crude 1-benzyl-3-(3,4-dimethoxyphenyl)-4-piperidone is obtained as a viscous, oily residue. The resulting compound may be converted into its oxime, in a manner analogous to that described in Example 1 section (d); after crystallization from ethanol the oxime has a melting point of 133°–134°; the monohydrochloride of the oxime has a melting point of 223° with decomposition (after crystallization from ethanol/ether).

b. 1-benzyl-3-(3,4-dimethoxyphenyl)-4-piperidylamine (isomer A).

2.5 l of ethanol are mixed with 1.5 l of liquid ammonia while cooling with chloroform/dry ice. 490 g of the crude 1-benzyl-3-(3,4-dimethoxyphenyl)-4-piperidone obtained above are dissolved in this mixture and hydrogenation is effected in the presence of 50 g of Raney-Nickel at 60° and 51 atmospheres for 6 hours. The catalyst is subsequently filtered off, the filtrate is concentrated by evaporation, the residue is again taken up in ethanol and 850 ml of a 3.5N solution of hydrogen chloride in ethanol are added while cooling. The mixture is allowed to crystallize for ½ hour while cooling with ice and the resulting 1-benzyl-3-(3,4-dimethoxyphenyl)-4-piperidylamine dihydrochloride (isomer A as racemate) is filtered off; M.P. 308° (decomposition).

c. 1-benzyl-3-(3,4-dimethoxyphenyl)-4-(3,3-diphenyl-propionyl-amino)piperidine (isomer A as racemate).

A solution of 5.3 g of 3,3-diphenylpropionyl chloride in 30 ml of chloroform is added to 7.4 g of 1-benzyl-3-(3,4-dimethoxyphenyl)-4-piperidylamine (isomer A as racemate). The mixture is allowed to stand at room temperature for 2 hours, is then heated to the boil for a short time, is again cooled and shaken out with a saturated aqueous potassium carbonate solution. The organic phase is separated, washed with a saturated aqueous sodium chloride solution, dried over sodium sulphate and concentrated by evaporation. The compound indicated in the heading is obtained as residue and is further worked up without purification.

Example 4:
Galenical preparation : tablets:

| | |
|---|---|
| 8,9-dimethoxy-6-(2,2-diphenylethyl)-2-methyl-1,2,3,4,4a,5,6,10b-octahydro-benzo[c]a[1,6]naphthyridine-dihydrochloride (Compound of Example 2) | 0.0577 g *) |
| Stearic acid | 0.0020 g |
| Polyvinyl pyrrolidone | 0.0050 g |
| Talcum | 0.0050 g |
| Maize starch | 0.010 g |
| Lactose | 0.0803 g |
| For a tablet of | 0.0160 g |

*) corresponds to 50 mg of the free base

We claim:

1. 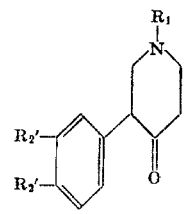

wherein $R_1$ is lower alkyl or benzyl, and each $R'_2$ is lower alkoxy or together form methylene dioxy.

2. 3-(3,4-dimethoxyphenyl)-1-methyl-4-piperidone is accordance with claim 1.

* * * * *

UNITED STATES PATENT OFFICE
CERTIFICATE OF CORRECTION

Patent No. 3,681,361     Dated August 1, 1972

Inventor(s) Adolf LINDENMANN et al.

It is certified that error appears in the above-identified patent and that said Letters Patent are hereby corrected as shown below:

<u>Column 3,</u> in the formula at line 40 change 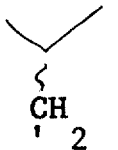

to read 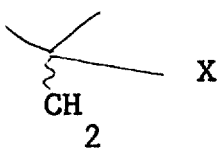

<u>Column 8,</u> line 63, after "10b" insert --hexahydro--

<u>Column 16,</u> line 9, delete "0.0160" and insert --0.160--

<u>Column 16,</u> (Claim 1), before the formula, insert

--A compound of the formula--

Signed and sealed this 9th day of January 1973.

(SEAL)
Attest:

EDWARD M. FLETCHER, JR.
Attesting Officer

ROBERT GOTTSCHALK
Commissioner of Patents